United States Patent [19]

Pauwels et al.

[11] 4,297,698

[45] Oct. 27, 1981

[54] 360 DEGREE LINEAR VARIABLE PHASE TRANSFORMER

[75] Inventors: Michael A. Pauwels, Kalamazoo; Abraham L. Poot, Portage, both of Mich.

[73] Assignee: Pneumo Corporation, Boston, Mass.

[21] Appl. No.: 847,938

[22] Filed: Nov. 2, 1977

[51] Int. Cl.³ .................... G08C 19/06; H01F 21/06
[52] U.S. Cl. ............... 340/870.32; 324/208; 336/45; 336/136
[58] Field of Search ............ 340/196, 195, 199, 207 P, 340/870.31, 870.32, 870.35, 870.36, 870.25; 336/130, 136, 225, 223, 170, 180, 45; 324/207, 208

[56] References Cited

U.S. PATENT DOCUMENTS

| | | | |
|---|---|---|---|
| 2,911,632 | 11/1959 | Levine | 340/195 |
| 2,988,697 | 6/1961 | Hirsch | 324/86 |
| 3,017,590 | 1/1962 | Chass | 336/136 |
| 3,138,772 | 6/1964 | Persons | 336/136 |
| 3,456,132 | 7/1969 | Dechelotte | 340/199 |
| 3,582,924 | 1/1971 | Uemura | 340/207 P |
| 3,663,911 | 5/1972 | Chass | 336/136 |
| 3,683,345 | 8/1972 | Faulkes et al. | 340/207 P |
| 4,083,237 | 4/1978 | Levesque | 340/199 |
| 4,134,065 | 1/1979 | Bauer et al. | 324/208 |

FOREIGN PATENT DOCUMENTS

963715 7/1964 United Kingdom ............... 336/136

OTHER PUBLICATIONS

Fitzgerald, A. E.; Kingsley, Charles Jr.; Kusko, Alexander, *Electric Machinery*, Third Edition, New York, 1971, p. 6.

*Primary Examiner*—James J. Groody
*Attorney, Agent, or Firm*—Maky, Renner, Otto & Boisselle

[57] ABSTRACT

A linear variable phase transformer directly converts mechanical displacement information to phase information capable of varying fully over preferably more than a 120° period of a typical AC cycle and up to 360° or more phase variation. Three or more linearly arranged primary windings produce respective AC magnetic fluxes that are phase separated by equal amounts over such full period. A core, which is movably positioned relative to the primary windings, receives and/or combines one or more of such fluxes to produce an output flux that induces in a secondary winding an output AC electrical signal having a phase corresponding to that of the output flux and, thus, the positional relationship of the core and the primary windings. The output AC electrical signal is a time-based signal that can be utilized directly in analog applications or readily demodulated for digital use. The use of anti-fringing primary windings to reduce fringe effects and an elongated core that has an apparent or effective length shorter than its actual physical length also are disclosed.

38 Claims, 7 Drawing Figures

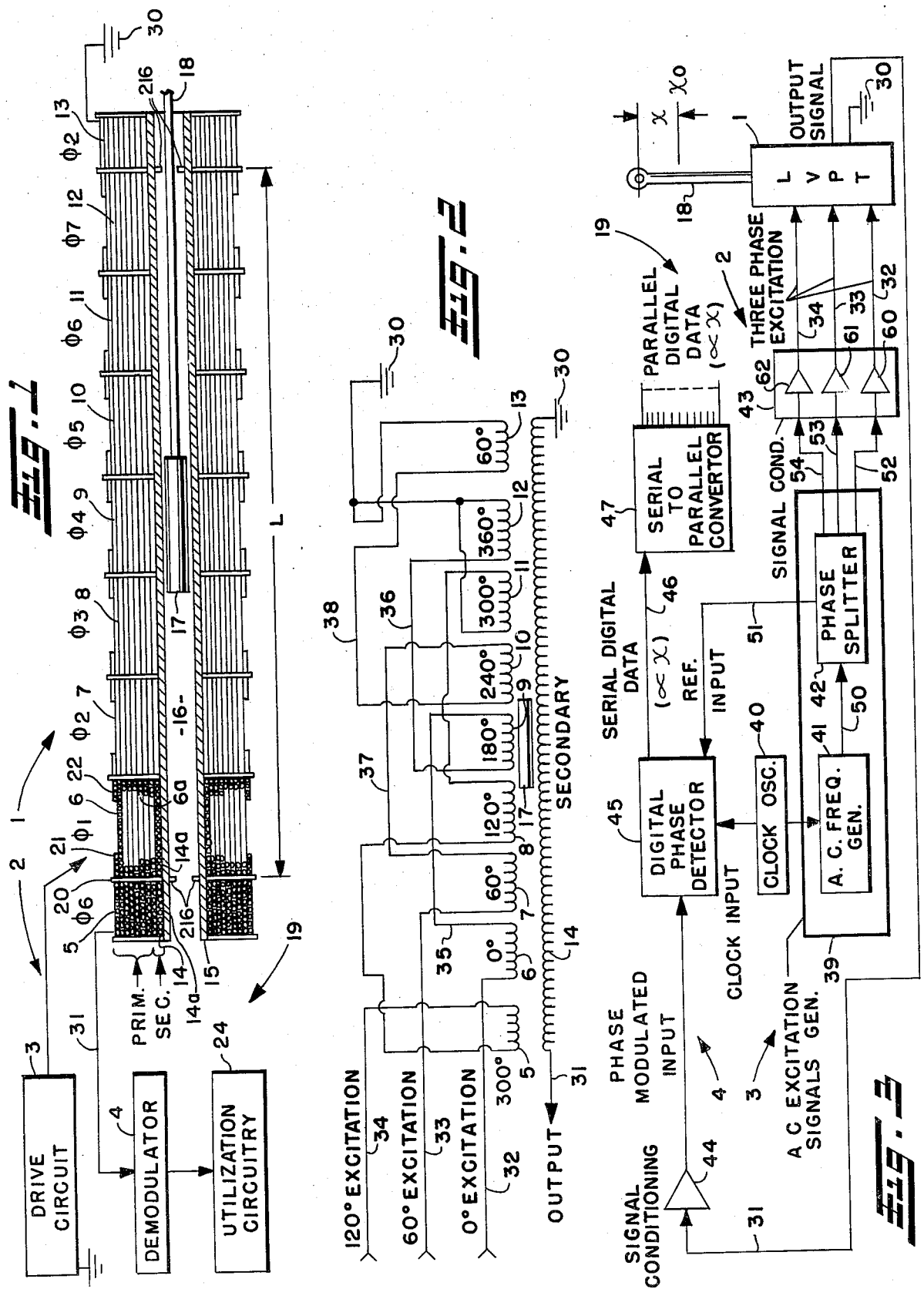

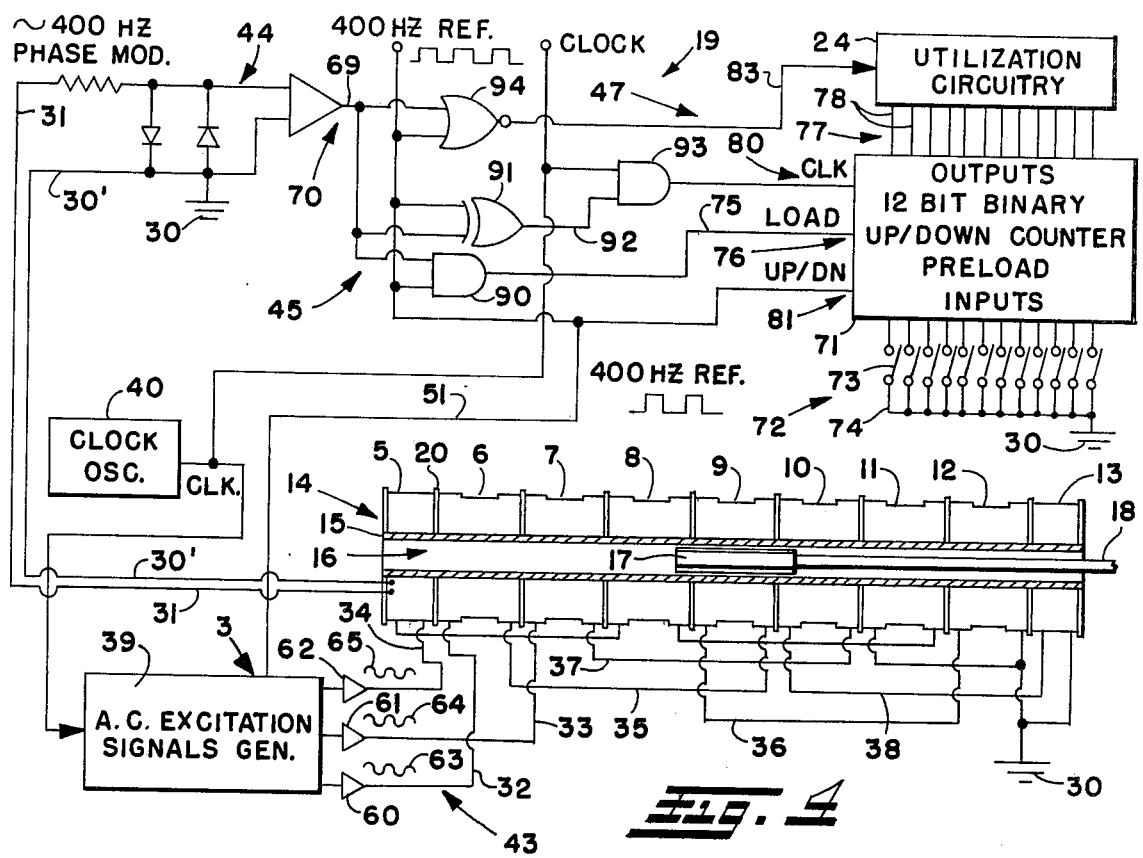
_Fig. 4_
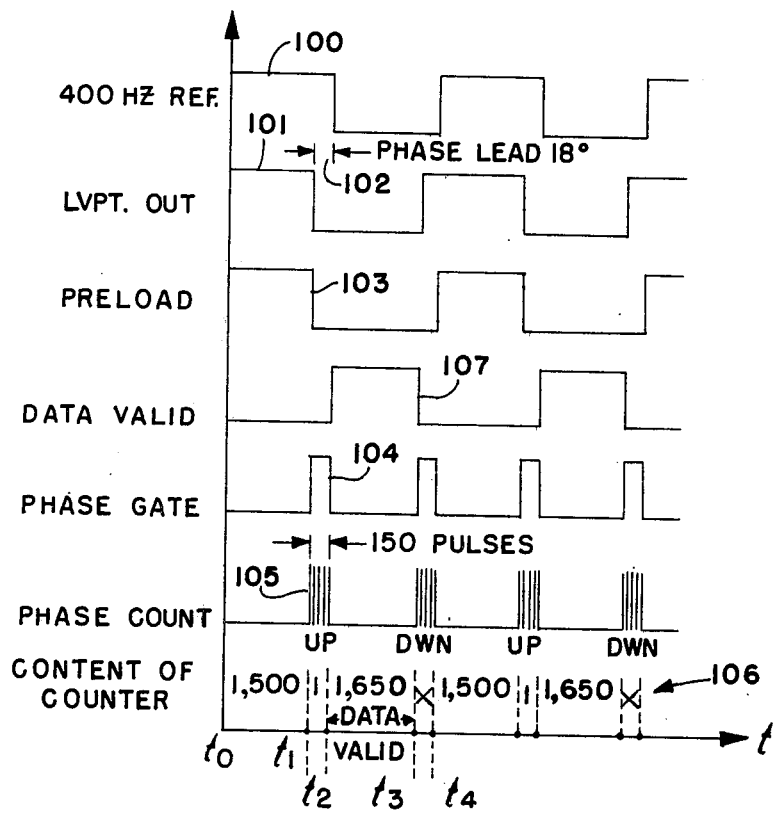
I = INCREASE  X = IMMATERIAL
_Fig. 5_

360 DEGREE LINEAR VARIABLE PHASE TRANSFORMER

BACKGROUND OF THE INVENTION

The present invention relates generally to displacement detecting transducers and, more particularly, to a transducer for converting mechanical displacement information to phase information that is fully variable over more than a 120° period. The preferred transducer is a linear variable phase transformer (LVPT) having three or more primary windings and a common secondary winding. An electronic system energizes the LVPT and converts the output signal therefrom to useful information.

RELATED PRIOR ART

One transducer that produces an output signal which varies in amplitude with respect to position is a linear variable differential transformer (LVDT). Although the input and output signals of LVDT's sometimes are described as phase related, the term "phase" there means polarity of an AC wave form. Other position transducers include moving coils wound on magnetically permeable material, such as resolver and syncro devices, or printed coils on magnetically permeable materials, such as Inductosyn devices, but these require moving contacts or wires. A selsyn device disclosed in U.S. Pat. No. 2,988,697 indicates the position of a movable core by combining radial flux vectors such that the geometric orientation of the flux vectors provides output information. In another position transducer disclosed in U.S. Pat. No. 2,911,632 the amplitude of the voltage induced in a secondary winding provides an indication of the position of a movable core.

CROSS-REFERENCE TO RELATED APPLICATIONS

The following U.S. patent applications are co-pending with and assigned to the same assignee as the present application:

Ser. No. 758,654, filed Jan. 12, 1977, now Pat. No. 4,134,065, for "Linear Variable Phase Transformer".

Ser. No. 784,335, filed Apr. 4, 1977, now Pat. No. 4,138,632, for "Pulse Width Modulator Digital Servo System".

The prior LVPT of the '654 application converts position information to a phase quantity or time-based relationship, which may be readily demodulated to provide a system output signal in a digital format. A pair of primaries energized by respective AC excitation signals, of the same frequency but phase separated by other than 0° or 180°, and preferably by 120°, produce in a relatively movable core axially oriented magnetic fluxes similarly out of phase. The fluxes are vectorially combined in the core and the combined flux vector or output flux, which has a phase related to the positional relationship of the core and primaries, induces in the secondary an electrical output signal which has a corresponding phase. The output signal phase is directly related to the phase of the flux in the core, and it is the relative mix of primary excitations in the core that phase modulates the output signal as a function of core position. To linearize the change in phase of the output signal with respect to core position (hereinafter referred to as linearity), the primaries of such LVPT are wound in accordance with the solution of a particular arc tangent function. Moreover, to assure a continuity of the output signal phase with respect to core position, the core length is at least about equal to that of each primary so the actual stroke lenght of the cores is about 50 percent or less of the total length of the LVPT.

In such application there is disclosed a circuit for energizing the respective LVPT primaries by the phase separated AC excitation signals, and such phase separation determines the maximum period or phase separation over which output information can be derived. A demodulator circuit, such as a zero crossing detector, detects the phase difference between the phase modulated output signal and a reference signal and whether the output signal leads or lags the reference signal, thereby to provide system output information indicative of the core position, with respect to a known position. The system output information may be displayed or used for other control or like purposes.

The servo system of the '335 application conveniently combines a digital feedback signal, which is developed in response to a time-based signal produced by an LVPT as a direct indication of the actual position parameter of a servo actuator, and a digital command signal, which is indicative of a desired position of the servo actuator, to produce digitally a pulse width modulated resultant signal that is fed back to control the servo actuator.

SUMMARY OF THE INVENTION

"Primary winding" and "secondary winding", are preferrred to as "primary" and "secondary". "Position" may specify the positional relationship of the LVPT core and primaries or may denote the core displacement, for example, from a null position. "Phase" means the actual phase of an AC electrical signal or magnetic flux signal or the separation relationship thereof to the phase of a reference such signal as opposed to a polarity relationship. "Phase quantity" means the phase difference between the LVPT phase modulated output signal or a square wave logic signal wave form in phase therewith, for example, and a reference signal; such phase quantity ordinarily will be distinguished with a polarity of its own to indicate whether the phase of the output signal is leading or lagging the reference signal. "Excitation phase" means an AC electrical signal of a particular phase for energizing or exciting a primary and may be used interchangeably with "AC excitation signal". "Digital form" or "digital format" means any form of digital-type number or electronic representation thereof, as opposed to an analog representation thereof; it will be appreciated that although the invention preferably provides a system output signal in a digital format, the system output signal could be provided in analog form as well. "Stroke" means the distance or movement measurable by the LVPT as relative movement between the core and primaries occurs.

In the LVPT in accordance with the invention three or more circumferentially wound primaries at equal axially spaced-apart locations produce respective magnetic fluxes in a magnetically permeable core. A circumferentially wound secondary has a phase modulated output signal induced therein by the combined output magnetic flux in the core. Such LVPT has improved linearity, accuracy, phase variation of the output signal, continuity of the output signal, and efficiency.

Total phase variation with respect to stroke is increased by using three or more primaries and exciting them with respective excitation signals that are phase separated by other than 0° or 180°, most preferably by less than 180°. Linearity is improved by the added primaries and by non-linearly winding those primaries, for example in accordance with the solution of an arc tangent function as described in the '654 application, which is incorporated by reference; however, it has been found that the increased number of primaries reduces the complexity with which they must be wound while still maintaining a high degree of linearity.

It has been discovered that the core will have an effective or apparent length shorter than the actual physical core length with the differential magnitude being generally inversely related to the overall diameters of the core and the space within the primaries in which the core moves and possibly also related to frequency. The apparent core length is that effectively seen by the primaries and secondary. Accordingly, when the core is physically aligned with or cutting a given number of turns of primaries and secondary, it really electro-magnetically appears to cut a few number of turns. Therefore, to maintain relative linearity and continuity of the output signal phase variation with respect to core movement while maximizing the stroke distance measurable by the LVPT, the actual core length should be approximately from about ten to about sixty percent longer than the axial length of a primary so the apparent core length will approximately equal the axial length of a primary. As used below, the term "core length" or the like will mean apparent core lenght.

Also, as the ratio of core length to LVPT length decreases, e.g. with added primaries and excitation phases, the ratio of stroke length of LVPT length increases, thereby clearly improving the measuring efficiency of the LVPT. Preferably the phases of the excitation signals and the respective magnetic fluxes are equally spaced apart fully over a given period which can easily exceed the limited maximum of less than 180°, ordinarily 120°, of the prior LVPT of the '654 application, and, in fact may be a full 360° or larger, if desired, through repetition. The phase of the output flux and output signal, then, can vary fully over that period or part thereof, depending on stroke length and LVPT length and the phase of the output signal can be demodulated with respect to a reference signal to derive a system output signal indicative of core position and of an external device coupled thereto.

In a six or more phase version the LVPT has been found operable, albeit with slightly degraded performance, even with one of the excitation phases missing. The phase of the output signal will be in error by only a few percent when the core is at least partially aligned with the primary coupled to the faulty excitation phase and the output voltage level produced when the core is at such location will decrease giving an independent failure indication. This type of operation has considerable importance in systems where it is necessary to continue operation, although with reduced effectiveness, while signaling a fault.

The large phase variation of the output signal, the increased stroke length ratio, and the increased phase-to-displacement linearity and/or ease of achieving the same, have been found to provide improved accuracy, efficiency, and capability of the LVPT, which also has the size, weight, strength, operative temperature range, etc. of the prior LVPT, without any substantial variation in the electronic circuits associated therewith.

In accordance with another feature of the invention the number of phase separated input AC excitation signals may be only one half of the n excitation phases required properly to excite such primaries by using reverse polarity connections, thus increasing the efficient use of the drive circuit.

It has also been discovered that by adding a partial primary winding and extending the secondary winding coextensive therewith at each end of the LVPT or by preventing core movement beyond about one half the axial length of full length end primaries, inaccuracies caused by fringing, i.e., the loss of a certain portion of the magnetic flux produced by the end primaries, can be reduced or eliminated.

With the foregoing in mind, it is a principal object of the present invention to provide a position-to-phase transducer, such as an LVPT, that is improved in the noted respects.

Another object is to increase the ratio of stroke length to case or LVPT length.

An additional object is to reduce the total coil length of an LVPT while at the same time maintaining the accuracy of the output information produced thereby.

A further object is to increase the total phase change of the output signal produced by an LVPT, for example, in excess of about 120° total phase change, preferably to as much as 360° phase change and, if desired, more.

Still other objects are to increase the linearity, accuracy, total phase variation, continuity, and efficiency of a position to phase transducer.

Still an additional object is to reduce the complexity of the winding patterns of an LVPT by increasing the number of primaries and phases of the excitation signals preferably while at the same time maintaining approximately a linear relationship between the phase of the output signal and the detected mechanical displacement.

Still a further object is to enable at least partial operability of a position to phase transducer with satisfactory accuracy when one of the excitation signals thereof fails.

Even another object is to provide an indication that a position to phase transducer is operating in a failure mode having one of the excitation signals thereof missing.

Even an additional object is to minimize the number of excitation signals required to energize respective primaries of a position to phase transducer at different respective phases.

Even a further object is to reduce fringing in an LVPT.

These and other objects and advantages of the present invention will become more apparent as the following description proceeds.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

BRIEF DESCRIPTION OF THE DRAWINGS

In the annexed drawings:

FIG. 1 is a longitudinal view, partly in section, of an LVPT in accordance with the invention;

FIG. 2 is a schematic view of the LVPT with wiring connections;

FIG. 3 is a general schematic electric circuit diagram in block form depicting driving and demodulator circuits for the LVPT;

FIG. 4 is a schematic electric circuit diagram, partly in block form, similar to the circuit of FIG. 3, but showing the demodulator circuit in greater detail;

FIG. 5 is a series of graphical representations of signals and counts that occur in the LVPT and electrical circuit of the invention during operation thereof.

DESCRIPTION OF THE PREFERRED EMBODIMENTS

Figure 6:
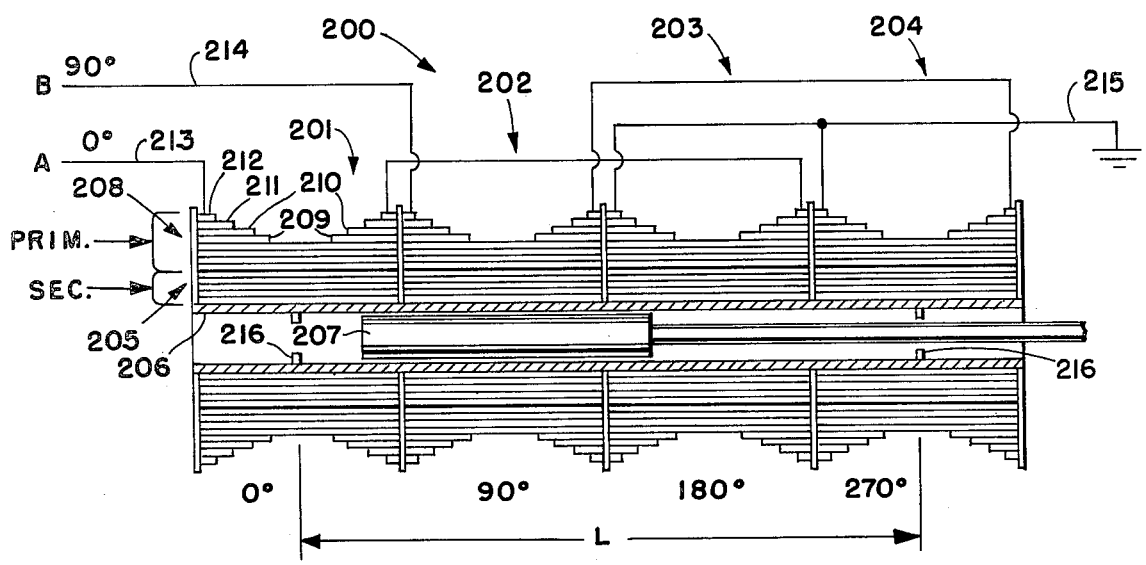
FIGS. 6 and 7 are longitudinal views, partly in section, of further LVPT's of the invention.

Referring in detail initially to FIG. 1, one example of a linear variable phase transformer (LVPT) in accordance with the invention is generally indicated at 1 with an electric circuit 2, which includes a drive circuit portion 3 for energizing the LVPT 1 and a demodulator output circuit portion 4 that directly converts the phase modulated output signal from the LVPT to a system output signal. The system output signal preferably is in a parallel or serial binary format although it may be provided in other digital formats, in analog format, or in other formats. In the present case the binary format of the system output signal facilitates interfacing with a computer system for output display or for control purposes.

The LVPT 1 includes nine primaries 5–13 and a secondary 14 which are circumferentially wound about a conventional non-magnetic hollow bobbin 15. The primaries and secondary may be sealed, encapsulated, or otherwise isolated from the external environment in which the LVPT 1 is located for protection from hostile environments. Within the hollow volume 16 circumscribed by the primaries and secondary and, if used, the bobbin 15, is a movable highly magnetically permeable ferromagnetic core 17, which is mechanically coupled by a connector 18 to an external member or device, not shown, the position of which is to be detected by the LVPT system 19 that includes the LVPT 1 and the circuit 2.

The purpose of the LVPT 1 is to phase modulate an output signal in accordance with the position of such external device, for example, as it is moved respective displacement amounts x (FIG. 3) from a null position $x_0$. The end primaries 5, 13 are intended to compensate for previously encountered deleterious fringing effects and are not included in the total axial length L of the LVPT 1, which length is measured between opposite ends of the measuring primaries 6, 12. Thus, the total stroke distance over which the core 17 is movable is equal to the length L less approximately the axial length of the core itself, and such stroke ordinarily is equal to the maximum total displacement of the external device.

The secondary 14 is formed of a plurality of circumferential turns 14a of electrically insulated wire arranged, for example, as illustrated in two layers about the bobbin 15. Although the secondary 14 is physically divided into several sections by the non-magnetically responsive dividers 20, preferably each secondary section is connected together so that they appear as a single secondary that is coextensive with all of the primaries, as is depicted in FIG. 2. Moreover, the secondary preferably is uniformly wound so that regardless of the core position it will always be aligned with or cut about the same number of secondary turns 14a and, therefore, the magnitude of the output signal induced therein will be relatively constant regardless of the core position. If desired, the secondaries may be electrically separate or non-uniformly wound, although in either such case the output circuit 4 may require modification to facilitate utilization of the one or more output signals induced in the secondary.

Preferably each of the primaries 6–12 occupies respective equal axial length sections along the bobbin 15 separated by dividers or spacers 20, which may be rigid or simply one or more layers of tape, and is similarly wound for the desired linearity. For example, in the preferred embodiment illustrated in FIG. 1, using 36 AWG wire the primary 6 has six layers of turns 6a, with each layer containing about 150 turns, and a partial layer of turns having two parts 21, 22, each including about 38 turns. Although the winding pattern for each primary 6–12 is similar to that employed in the prior LVPT mentioned above, i.e. non-linear winding generally in accordance with an arc tangent function, in the use of partial layers, 21, 22, it has been discovered that the increased number of primaries and excitation phases here provides good linearity, e.g. with only a maximum of several percent error, and in many instances as little as several tenths of a percent error, without requiring the detailed complexities of the prior winding technique. Thus, in the present LVPT the arc tangent function winding pattern need only be roughly approximated although even such approximate use has been found importantly helpful to improve linearity. Such approximation may be empirically done until the desired degree of linearity is achieved. Moreover, it has been discovered that such linearity, i.e. as mentioned above, can be achieved for an LVPT employing nine primaries, each having the same number of complete layers of turns, say nine layers with 111 turns each, excited by eight excitation phases separated by 45° without any partial layers. As the number of primaries and excitation phases decreases, for example to five primaries and four excitation phases, or to four and three, respectively, the number and size of the required partial layers to maintain linearity will increase.

During use of the LVPT 1 to detect the position of the external device, each of the measuring primaries 6–12 is excited by respective AC excitation signals such that the phase separation between the excitation signals delivered to adjacent primaries is other than 0° or 180° and preferably such that the phase separations between the excitation signals applied to respective pairs of those primaries are equal. Moreover, in the embodiment of FIGS. 1 and 2, the phases of the exitation signals delivered to the first and last primaries 6, 12 are the same, one being considered 0° and the other 360° displaced therefrom, and the phase separation of the excitation signals to respective pairs of adjacent primaries 6–12 is 60°, as is illustrated in FIG. 2.

The effective axial core length preferably is at least equal to the axial length of at least one of the primaries 6–12 plus the thickness of one of the dividers 20 for linear continuity in the output signal phase change with respect to core displacement. It has been found that the actual core length, accordingly, should be about ten to sixty percent more than the effective core length, and preferably about thirty to fifty percent. However, if desired, the core length may be increased from such minimum thereby further reducing any undesirable effect that the dividers 20 might have, although such increased core length would reduce the stroke-to-length (L) ratio, and, thus, the efficiency of the LVPT. The use of such dividers 20 to separate the primaries has been found helpful to facilitate adjustment in the linearity of the LVPT 1.

The one or more primaries with which the core 17 is aligned or proximate produce respective magnetic fluxes in the core with such fluxes being out of phase by the phase separation of the respective excitation phases. Preferably the excitation phases are supplied from controlled constant current sources in the drive circuit portion 3 or from constant voltage sources with respective series resistors so that the excitation phases have substantially identical AC wave forms with the fundamental frequency of each being out of phase with respect to the others in the manner described above. The wave form could be sinusoidal, rectangular, triangular, or any other periodic wave form which contains the desired fundamental excitation.

The magnitude of each such induced flux vector depends on the number of turns of the respective primary effectively aligned with or cut by the core 17 and preferably the phase of each such flux corresponds to that of the respective excitation phase causing the same. The independently induced magnetic flux vectors, which extend in an axial direction due to the circumferential arrangement of turns, are combined in the core 17 resulting in a combined flux vector sum or output flux therein. When the core is aligned with only one primary, the phase and amplitude of the output flux will effectively be due only to the excitation phase delivered to that primary. However, when the core is aligned with at least part of two primaries, the phase and amplitude of the output flux will be different from each of the respective phases and amplitudes of the respective independently induced magnetic flux vectors.

The output flux induces an AC output signal in the secondary 14 with the phase of such output signal being directly related to the phase of the output flux. Therefore, as relative movement occurs in the LVPT 1 between the core 17 and the respective primaries 6–12, the fundamental frequency of the output signal is phase modulated and, thus, is provided as a time-based signal indicative of the core position. Preferably the primaries and secondary are fixed and the core is the movable part of the LVPT; however, it will be appreciated that alternatively the core may be fixed and the primaries and secondary moved.

The demodulator 4 compares the actual phase of the phase modulated output signal to that of a reference AC signal. The phase quantity or phase difference between those signals and whether the output signal leads or lags the reference signal are indicative of the core position relative to the primaries 6–12. The demodulator 4 directly converts that phase difference to a parallel or serial digital signal as the system output signal of the LVPT system 19. Such system output signal may be delivered to utilization circuitry 24 for display, control, or other purposes, as desired.

In the past fringing effects have reduced the linearity of the output signal phase-to-displacement relationship. Fringing is the loss at the LVPT ends of some of the electromagnetic signal that induces magnetic flux in the core or that induces the output signal in the secondary. However, by adding the partial anti-fringing primaries 5, 13 at the opposite ends of the LVPT 1 and exciting those with respective excitation signals that are equally phase-separated from the excitation signal of the adjacent primaries 6, 12, respectively, the fringing effects can be substantially eliminated. In the LVPT 1 each of the primaries 5, 13 has seven layers of about 81 turns each; the axial length, number of layers, and number of turns in each being capable of facile empirical determination to eliminate fringing. The effect of the anti-fringing primaries 5, 13, then, is to maintain linear the change in phase of the output flux as the core 17 approaches the respective ends of the stroke length L.

The magnitude of the output flux is immaterial so long as it is sufficiently large to induce the output signal in the secondary 14 at a sufficiently large and ordinarily substantially constant magnitude such that the demodulator 4 or other output circuit associated with the LVPT 1 is capable of detecting the output signal phase. The total number of primary and secondary turns and the signals in the primaries should be sufficient to produce such an output signal.

For linearly wound primaries of a two-phase LVPT, the output phase will not vary linearly with core position, but, by altering the winding pattern of the primaries such that the number of turns engaged with the core varies non-linearly with position, the variation in the phase of the output flux with respect to the core position can be made more nearly linear. The proposed alteration to the individual windings for linearization purposes can be effected empirically or mathematically according to the disclosure of the '654 application. Such linearization technique may be employed in the LVPT 1 of the present invention to improve linearity. However, as seen in the drawings here the rigorous winding patterns of the prior LVPT need only be approximated in the present LVPT with three or more primaries.

In FIG. 2 the secondary 14 is connected between a reference ground potential 30 and an output line 31, which delivers the phase modulated output signal to the demodulator 4. As the core 17 moves along the length of the LVPT 1 and secondary 14, the phase of the output signal induced in the secondary will vary according to the relative positions of the core and primaries with full phase variation being about 360°. Moreover, in FIG. 2 there is illustrated a convenient connection arrangement that enables the seven measuring primaries 6–12 and the two anti-fringing primaries 5, 13, to be energized by respective excitation phases using only three input AC excitation signals on lines 32, 33, 34. The first input AC excitation signal has 0° relative phase, and the second and third input AC excitation signals are phase-shifted from the first, respectively, by 60° and 120° amounts. The first input AC excitation signal on line 32 flows through the first measuring primary 6 in one direction, on line 35 flows through the fourth measuring primary 9 in the relatively opposite direction, and on line 36 flows through the seventh measuring primary 12 in the original direction ultimately to the ground connection 30. Accordingly, the excitation phases energizing the primaries 6, 12 will be the same, and that energizing the primary 9 will be 180° out of phase therewith. Similarly, the second input AC excitation signal on line 33 flows through the second measuring primary 7 in the above-mentioned first direction, so that the excitation phase thereof is 60° shifted from that of the first primary 6, and such second input AC excitation signal coupled by line 37 flows in an opposite direction through the fifth primary 10 so that the excitation phase thereof will be 180° out of phase with that energizing the primary 7 and 60° out of phase with that energizing the primary 9. Line 38 couples the second input AC excitation signal to the anti-fringing primary 13 so that its excitation phase is the same as that of the primary 7, and the third input AC excitation signal on line 34 is delivered to the anti-fringing primary 5 and to the measuring primaries 8 and 11 to energize them as illustrated in FIG. 2. Accordingly, the excitation phases of the respective primaries 5-13 will have the phase relationship indicated in FIG. 2 to the first input AC excitation signal on line 32.

Referring to FIG. 3, it will be appreciated that the preferred electric circuit 2 is but one form of drive circuit 3 for exciting the primaries 5-13 of the LVPT 1 and demodulator 4 for analyzing the phase of the output signal preferably as a comparison with respect to the phase of a reference signal and that other types of electric circuits may be equivalently employed. Fundamentally, the drive circuit 3 includes an AC excitation signals generator 39, which generates the input AC excitation signals having the same fundamental frequency but being phase shifted as described. A conventional clock oscillator 40 produces a continuous train of clock pulses, for example at 1.2 MHz., and an AC frequency generator 41 divides the clock pulses, for example, to a 2.4 KHz. input signal. A phase splitter 42 digitally splits, for example, that input signal into a reference and three input AC excitation signals having the same fundamental frequency but different respective phases, and a signal conditioning circuit 43, such as filters and/or amplifiers, shapes and/or amplifies the respective input AC excitation signals to desired form for exciting the respective primaries of the LVPT 1.

The demodulator 4 includes a signal conditioning circuit 44, which shapes and/or amplifies the phase modulated output signal from the secondary of the LVPT 1 to a convenient form, such as a square wave; and a digital phase detector 45 compares the conditioned phase modulated signal with the reference signal and produces a digital output representative of that comparison and, thus, of the core displacement in the LVPT 1. Preferably, the digital phase detector 45 receives the train of clock pulses from the clock oscillator 41 and periodically passes respective bursts of those pulses to line 46 with the number of pulses in each burst being representative of the phase difference between the conditioned phase modulated output signal and the reference signal. Those bursts of pulses are in the form of serial digital data proportionally representative of the LVPT core displacement. The demodulator 4 also may include a serial to parallel converter 47, e.g. a counter, that converts the serial digital data to parallel digital data, such as discrete binary numbers, binary coded decimal numbers, etc. proportionally representative of the LVPT core displacement.

The clock oscillator 40 and the other portions of the electric circuit 2 receive appropriate $V_{cc}$ power or the like from a conventional power supply coupled to appropriate terminals, not shown. The 2.4 KHz signal is delivered via the line 50 to a three-stage JK flip-flop circuit forming the phase splitter 42 as in the '654 application. Each stage of the JK flip-flop is coupled such that in response to the 2.4 KHz signal the JK flip-flop digitally splits such input signal to produce a 400 hertz square wave reference electrical signal on reference line 51 and the first, second and third 400 hertz square wave excitation signals on the excitation lines 52, 53, 54. Moreover, the JK flip-flop produces the input AC excitation signals such that the first leads the second and third, respectively, by 60° and 120° and the reference signal by 180°. Thus, each stage may produce a respective excitation signal and the reference signal may be derived from the inverse of the stage producing the first such signal.

The signal conditioning circuit 43 has three conventional filters and amplifiers 60, 61, 62 which convert the respective square wave excitation signals to respective sine waves 63, 64, 65 (FIG. 4) still maintaining the relative phase relationships and deliver them as the respective input AC excitation signals via the drive lines 32, 33, 34 to the respective primaries 5-13 of the LVPT 1. The amplifiers 60-62 are of the constant current type so that the amplitude and phase of each input AC excitation current signal delivered thereby remains substantially constant regardless of the changing effective impedance of the primaries 5-13, although the voltage may change.

The phase modulated output signal produced by the secondary 14 is delivered via the output lines 30', 31, (FIG. 4) to the demodulator circuit 4. If the excitation is other than sinusoidal, a conventional filter may be required in line 31. The demodulator 4 is in effect a phase detector circuit 45 that detects the phase of the phase modulated output signal preferably by comparing the phase thereof to that of the reference electrical signal on the reference line 51. At the input of the demodulator 4 a signal conditioning circuit 44, such as a squaring circuit, converts the phase modulated sinusoidal output signal to a phase modulated square wave signal on the line 69 for delivery to the logic circuitry 70, which operates in part as a zero crossing or relative phase detector.

The demodulator 4 also includes a conventional electronic counter 71, acting to convert serial digital data to parallel digital data, which in the preferred embodiment is in the form of a twelve bit binary up/down counter including a plurality of preload input circuits 72 to insert off-set information in the counter. Each input circuit 72 comprises a switch 73 that may be selectively closed to complete a circuit to a relative ground connection 74 or some other source of known potential. Each of the switch circuits in the preload input circuits 72 represents a respective bit of, for example, a twelve bit binary number. By closing the switch 73 in one of the switch circuits that particular bit becomes a logic 0 signal level due to the ground connection 74, and by opening such switch such bit becomes a logic 1 signal, for example, a relatively positive voltage level. A logic 0 signal indicates a connection to a source of relative ground potential and a logic 1 signal indicates a connection to a relative positive potential, although other logic conventions may be used.

Depending on the particular adjustment of the preload input circuits 72, a predetermined binary off-set number may be preloaded into the counter 71 whenever the leading edge of a positive load signal appears on the loading line 75 to the load input 76 of the counter causing the latter immediately to assume a count level indicative of such number. A twelve bit binary system output signal representative of a binary number output is therefore produced at the output 77 of the counter 71 on output lines 78 indicative of such off-set number. The counter 71 may comprise, for example, three cascaded 4-bit binary counter microcircuits, such as those manufactured by RCA under Part No. CD 4029 AE or similar devices which are preferably connected in a parallel clocking arrangement. The counter 71 includes a clock input 80 to receive bursts of clock pulses from the oscillator 40 via the logic circuitry 70 and an up/down control input 81 that determines whether the counter 71 is to count up or down from the off-set number count level. Such up/down control depends on the relative polarity of the reference electrical signal when the bursts of clock pulses are delivered to the clock input 80.

Coupled to the counter output 77 is utilization circuitry 24. The utilization circuitry may comprise latching and display circuits for displaying the binary number system output signal from the counter 71 in true binary or digital format, a control type circuit to provide a control function in response to such system output signal and, thus, the position of the core 17 in the LVPT 1, etc. The utilization circuitry 24 preferably is of the controlled type such that it only receives the system output signal from the counter output 77 when also receiving a logic 1 data valid signal at a control input 83 from the logic circuitry 70.

In the logic circuitry 70 is an AND gate 90 which has two inputs respectively coupled to the reference line 51 and line 69 to receive the reference electrical signal and the phase modulated square wave signal. The output of the AND gate 90 is coupled to the load input 76 of the counter 71. When both input signals to the AND gate 90 are logic 1, a logic 1 output is produced, the leading edge of which causes the counter 81 to preload the off-set number from the preload input circuits 72. An Exclusive OR gate 91 has its inputs also coupled to the reference line 51 and line 69 to receive the reference electrical signal and the phase modulated square wave signal. The Exclusive OR gate 91 will produce a logic 1 signal on the line 92 when the reference electrical signal and the phase modulated square wave signal are of opposite polarities. Such logic 1 signal is a phase gate signal that enables an AND gate 93, referred to below as a phase gate, to pass a burst of clock pulses from the oscillator 40 to the clock input 80 of the counter 71, whereupon the counter is incremented or decremented an amount determined by the phase count, i.e. the number of clock pulses in the burst passed by the phase gate 93. The resulting count level achieved by the counter 71 in a binary format is applied at the counter output 77 on lines 78 as the system output signal directly indicative of the phase of the phase modulated output signal and, thus, of the position of the core 17 in the LVPT 1.

A NOR gate 94 produces a logic 1 signal at the control input 83 of the utilization circuitry 82 whenever both the reference electrical signal and the phase modulated square wave signal are at relatively zero or negative potentials, which will occur only after two conditions are both satisfied, namely, first, a predetermined binary number from the preload input circuits has been preloaded into the counter 71 and, second, a valid counting of a phase count has occurred. If the reference and output signals are out of phase the number of counts or pulses in each burst will be a non-zero number, but if those signals are in phase the Exclusive OR gate 91 will not be satisfied, the number of counts in the phase count burst will be zero, i.e. the phase count is zero, and the data valid signal will be produced promptly at the conclusion of the logic 1 load signal from AND gate 90. Then immediately following the valid counting of a non-zero or zero phase count by the counter, e.g. immediately following the conclusion of a proper phase gate signal, such logic 1 data valid signal is produced by the NOR gate 94. Such data valid signal energizes or opens the utilization circuitry 82 to receive the system output binary signal on the output lines 78 of the counter 71.

Operation of the LVPT 1 and the electric circuit 2 of FIG. 3 will now be described assuming that the core 17 is in null position evenly centered relative to the primary 9. The phase of the phase modulated output signal on the output lines 30', 31, from the secondary coil 14 and, particularly, the phase of the phase modulated square wave signal on the line 69 will be exactly the same as the phase of the reference electrical signal on the reference line 51. The value of the off-set number set by the switches 73 in the preload input circuits 72 may be set to a digital value of 1,500, for example, which will be the digital value of the system output signal on the output lines 78 when the core 17 is in null position. The binary number 10111011100 represents the digital value of 1,500; for each zero or one in the binary number a respective switch 73 is closed or opened, respectively.

When both the reference electrical and phase modulated square wave signals are positive, the AND gate 90 is satisfied and the off-set number is preloaded from the switches 73 into the counter 71. However, the Exclusive OR gate 91 will never be satisfied between the reference electrical signal and the phase modulated square wave signal are exactly in phase; therefore, a phase gate signal will not be produced, and the counter 71 will never be incremented or decremented from the preloaded off-set number count level. When both the reference electrical signal and the phase modulated square wave signal are at logic zero levels, the NOR gate 94 is satisfied to provide a data valid signal which opens the utilization circuitry 82 to receive the system output signal on the output lines 78. Since the counter 71 has not been incremented or decremented, the system output signal will be the same binary number as that originally preloaded into the counter 71; thus, the off-set number value produced as the system output signal indicates a null position of the core, and by resetting the switches this value may be changed. This operation will repeat cyclically as long as the core 17 remains in the null position in the LVPT 1.

Assume now that the core 17 is displaced to the left relative to the null position illustrated in FIGS. 1 and 2 by an amount such that the phase of the output signal and, thus, of the phase modulated square wave signal will lead the reference signal by 18°, and also assume the foregoing criteria. The reference electrical signal will be as illustrated at 100 in FIG. 5 having relatively positive (logic 1) and negative (logic 0) going portions. The phase modulated square wave signal, which would appear on line 69 of the electric circuit 2, is illustrated at 101, such signal also having relatively positive (logic 1) and negative (logic 0) portions. The phase difference between the reference electrical signal and the phase modulated square wave signal is indicated generally at 102, whereby the phase modulated square wave signal relatively leads the reference electrical signal by 18°.

The preload signal from the AND gate 90 is indicated at 103 having relatively positive (logic 1) and negative (logic 0) portions, the logic 1 portions appearing whenever both the reference electrical signal and the phase modulated square wave signal are relatively positive. Thus, whenever the preload signal 103 is logic 1 the off-set number from the preload input circuits 72 will be preloaded into the counter 71. At time $t_1$, the phase modulated square wave signal 101 drops to logic 0 while the reference electrical signal 100 remains logic 1; therefore the Exclusive OR gate 91 is satisfied to produce a logic 1 phase gate signal 104. The phase gate signal 104 will terminate at time $t_2$ when the reference electrical signal 100 drops to logic 0, whereupon the Exclusive OR gate 91 no longer is satisfied. However, during the time from $t_1$ to $t_2$ while the phase gate signal 104 is being produced, the phase count, i.e. a burst of the clock pulse signals from the oscillator 40, generally depicted at 105, is delivered to the clock input 80 of the counter 71.

Inasmuch as the phase separation between the phase modulated square wave signal 101 and the reference electrical signal 100 is 18°, the number of pulses per burst of the phase count is equal to 18° divided by 360° times 3000 counts or clock pulses, which is the number of clock pulses in one 400 hz. period, that equals 150 pulses per burst. Moreover, since the reference electrical signal 100 is positive while the phase gate signal 104 is produced, the counter 71 will be incremented by the phase count value of 150, i.e. the counter will count up from the preloaded off-set count level of, say 1,500, to a value of 1,650. This 1,650 value will be provided on the output lines 77 in a binary format. The actual contents or count level of the counter 71 whenever the counter is not counting is illustrated in the blocks 106. Thus, the counter 71 is at the preloaded count level of 1,500 between times $t_0$ and $t_1$, and after having counted the phase count of 150 pulses, the counter will be at a value of 1,650 between times $t_2$ and $t_3$. Moreover, at the time $t_2$ when the reference electrical signal 100 goes to logic 0 terminating the phase count, the NOR gate 94 is satisfied so that a data valid signal 107 is produced so that the system output signal on the output lines 78 from the counter 71 is loaded into or otherwise delivered to the utilization circuitry 24.

At time $t_3$ of FIG. 5 the phase modulated square wave signal 101 on the line 69 again becomes logic 1 while the reference electrical signal remains relatively negative, thereby satisfying the Exclusive OR gate 91, which then allows another burst of clock pulses to pass to the clock input 80 of the counter 71. In this case, the counter 71 would then count in a downward direction from the 1,500 count level previously achieved because the reference electrical signal is then at a relatively negative level. However, such downward count is immaterial because there will be no data valid signal occurring thereafter; rather, at time $t_4$ the reference electrical signal goes positive again so that the AND gate 90 is satisfied causing the off-set number in the preload input circuits 72 to be preloaded into the counter 71 again. Such operation will occur continuously as the core 17 remains at the indicated position to the left of its null position.

Moreover, similar operation of the LVPT 1 and the electric circuit 2 will occur when the core 17 moves to the right of the null position such that the phase of the phase modulated output signal on the output lines 30', 31 and the phase modulated square wave signal on the line 69 will lag the reference electrical signal. In this case, the off-set number will be preloaded into the counter 71 when both the reference electrical signal and the phase modulated square wave signal are relatively positive, but the positive phase gate signal will be produced when the reference electrical signal goes negative while the phase modulated square wave signal remains positive. Also, since the reference electrical signal will be negative when the phase gate signal is produced and the phase count is passed to the counter 71, the latter will be decremented by the phase count.

At the conclusion of the phase gate signal when the phase modulated square wave signal goes negative, the data valid signal will be produced so that the utilization circuitry 24 receives the system output signal as the decremented count level achieved by the counter 71. Similar cyclical operation of the LVPT 1 and electric circuit 2 will occur as long as the phase modulated output signal lags the reference electrical signal.

Another preferred embodiment of LVPT 200 illustrated in FIG. 6 has four primaries 201–204, a secondary 205, a bobbin 206, and a movable core 207 constructed and arranged generally as described above. The secondary is formed of five layers of turns of 36 AWG wire uniformly wound on the bobbin 206, which may be about two inches long. Each primary is about one half inch axial length and the core 207 has an equivalent effective axial length and about a one tenth inch diameter. Moreover, each primary is formed by four complete layers of turns 208 totalling about four hundred eight turns, two partial single layers of turns 209 of twenty-one turns each, two partial single layers of turns 210 of eleven turns each, two partial single layers of turns 211 of five turns each, and two partial single layers of turns 212 of one turn each.

Two AC excitation signals A and B, which are 90° out of phase, i.e. in quadrature, are provided on lines 213, 214 by a conventional power supply. A ground connection is provided at line 215. Although the turns of the primaries all are in the same direction, the input and output leads are connected, as illustrated in FIG. 6 and as described above in reverse polarity relation, so that assuming the phase of the excitation signal to primary 201 is considered at 0° the phase of the excitation signal to primary 203 is displaced to 180°. Moreover, the excitation phase to primary 202 is at 90° and the excitation phase to primary 204 is at 270°.

As the core 207 moves from alignment with primary 201 to alignment with primary 204, the phase of the output signal will vary approximately over a 270° range, and such phase modulation can be readily demodulated in the above described demodulator 4. Thus, although the LVPT 1 above uses n, say six, excitation phases to energize n+1 primaries with the extra primary compensating for the finite core length so that, for example, a full 360° output phase variation can be obtained, the LVPT 200 of FIG. 6 uses an equal number of primaries and excitation phases. Such equality, on the one hand, may simplify the LVPT's construction and electrical requirements, while, on the other hand, obtains only a reduced total variation of the output signal phase.

Moreover, if a still further reduction in the range of variation of the output signal phase can be tolerated, say, for example, reducing the same to 180° variation, the core 207 movement may be limited, e.g. by stops 216, to the reduced stroke of length L' minus the core length. With the core movement so limited to from about the inner one half the axial length of primary 201 to about the inner half of primary 204, the output signal phase may vary by about 180° and, importantly, the outer halves of the primaries 201 and 204 provide antifringing compensation as described above.

Figure 7:
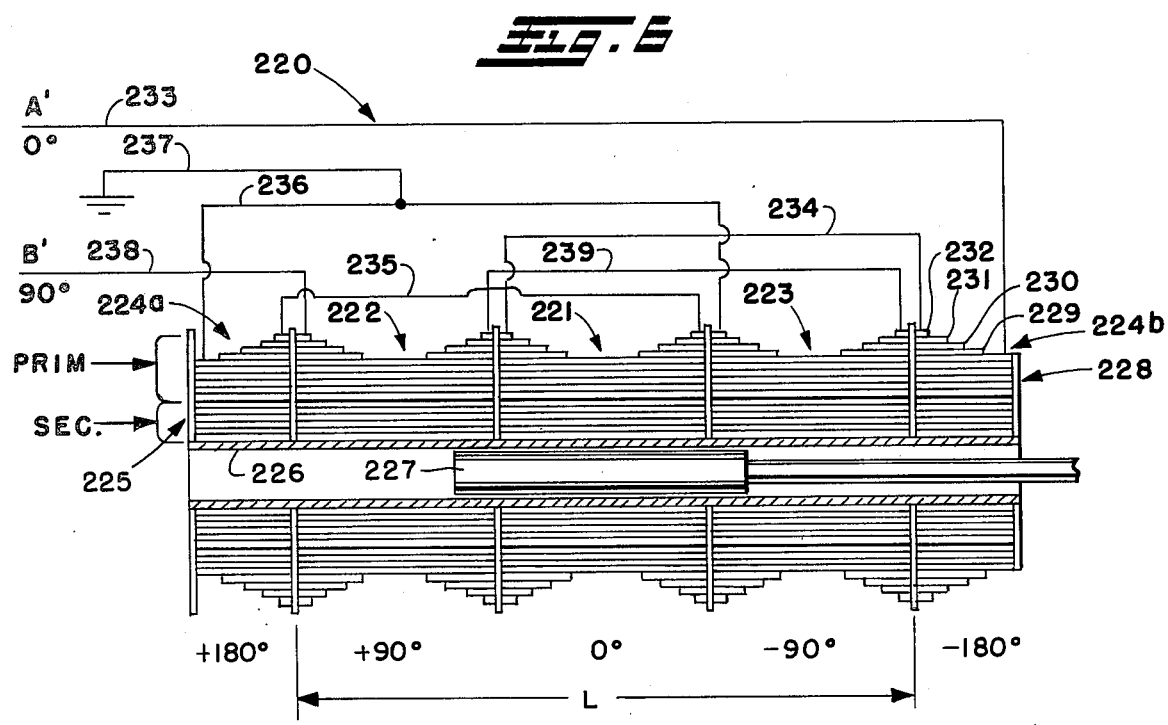

Turning now to FIG. 7 the most preferred embodiment of LVPT 220 is illustrated. The LVPT 220 includes four primaries 221–224, the latter including similar halves 224a, 224b; a secondary 225, as above except with six instead of five layers of turns for increased output signal strength; a bobbin 226; and a movable core 227. The complete and partial layers of turns of primaries 221–223 are wound as described above with reference to the primary 201. The primary 224, however, although also similarly wound, is divided into the two halves 224a and 224b, each of which has four complete layers of turns 228 totaling about two hundred five turns, and four partial signal layers of turns, 229–232 of, respectively, twenty-one, eleven, five and one turns each, as above.

The primaries 221–224, which are conveniently wound in the same direction, are energized by a conventional power supply that produces two excitation signals phase separated by 90°. The first excitation signal A' on line 233 presumptively having a 0° phase is coupled in one polarity direction to the primary 221 and in the primary 221 and in the opposite polarity direction to the primary halves 224a, 224b, as shown by series connection lines 233–235. The line 236 couples such series connected primaries to a ground connection 237. Thus, assuming that the polarity of connections to the primary 221 is in a forward direction, the excitation phase of that primary is the same as the signal A', namely 0°, and the polarity of the connections to primary halves 224a and 224b are, say, negative, so the excitation phases are 180°. Line 238 delivers the second excitation signal B' so that the excitation phase of primary 222 is +90° phase displaced from that of primary 221 and line 239 couples such excitation signal so that the excitation phase of primary 223 is relatively phase displaced by −90°. Line 240 connects the series coupled primaries 222, 223 to the ground connection 237.

The above-described reverse polarity connection scheme is, thus, employed in the LVPT 220 to obtain the relative excitation phases of the primaries, respectively, as illustrated in FIG. 7, at +180°, +90°, 0°,−90°, and −180°, where the first +180° and last −180° are really the same phase displacement from 0°, the signs being different only for series continuity in the LVPT.

In use of the LVPT 220, core movement occurs between primaries 221–223 over length L″, with stroke being about equal to length L″ minus core length. The primary halves 224a and 224b, then, provide anti-fringing effect. When the core 227 is aligned with the primary 221, the output signal phase will be about 0°; thus, it will be appreciated that the 0° excitation signal A' in this embodiment may conveniently be utilized as the reference signal in the demodulator 4. As the core 227 is moved to alignment with primaries 222 or 223, the output signal phase simply shifts toward plus or minus 90°, respectively.

We, therefore, particularly point out and distinctly claim as our invention:

1. A displacement to phase transducer, comprising at least three primary means for producing in response to alternating current excitation alternating magnetic fluxes, combining means for producing an output flux having a phase dependent on the relative positions of said combining means and said primary means, at least one of said primary means and combining means being movable relative to the other, and secondary means for producing an output AC electrical signal having a phase corresponding to the phase of said output flux, and wherein each of said primary means includes a plurality of full layers of circumferentially wound turns and at least one partial layer of circumferentially wound turns so arranged to provide a substantially linear relation between the phase of said output flux with respect to the relative positions of said combining meand and said primary means.

2. The transducer of claim 1, wherein each of said primary means includes a plurality of different length partial layers.

3. The transducer of claim 2, wherein the axial length of the partial layers more radially proximate the circumferential center of the transducer is longer than that of the more radially remote such partial layers.

4. The transducer of claim 1, wherein said primary means are approximately equally spaced along a generally linearly extending axis and are wound according to the approximate solution of an arc tangent function.

5. The transducer of claim 1, further comprising an axially extending non-magnetic bobbin, said primary means being circumferentially wound about said bobbin, and a plurality of non-magnetic spacers, each being positioned between respective adjacent primary means.

6. The transducer of claim 5, wherein said combining means comprises a magnetically responsive core movably positioned in said bobbin and having a length exceeding the axial length of each primary means.

7. The transducer of claim 1, further comprising supply means for supplying such alternating current excitation such that at least three of such alternating magnetic fluxes have different phases and the phases of the alternating magnetic fluxes of any two adjacent primary means are different by other than 180° of 360°.

8. The transducer of claim 7, wherein said supply means supplies plural AC excitation signals, and further comprising coupling means for coupling said supply means to said primary means such that the phase of the AC excitation signal in each of two adjacent primary means is different.

9. The transducer of claim 8, wherein said primary means comprise at least four primaries, said supply means comprises means for supplying at least two AC excitation signals, and said coupling means comprises means for coupling each of said AC excitation signals to two different primaries, respectively, in reverse polarity relation.

10. The transducer of claim 7, wherein said primary means are positioned in spaced relationship along a common axis, said supply means includes circuit means for developing a plurality of phase separated AC excitation signals equal to the number of primary means less one and coupling means for coupling one of such AC excitation signals to both primary means at the respective extremities of such axis and the remainder of such AC excitation signals to respective primary means such that there is equal phase separation between the respective AC excitation signals coupled to respective pairs of adjacent primary means.

11. The transducer of claim 1, wherein said primary means are positioned along a common axis, and wherein said combining means comprises a magnetically responsive core having an effective axial length at least about equal to that of the primary means having the longest axial length.

12. The transducer of claim 11, wherein the actual length of said core is on the order of about ten to about fifty percent greater than the effective length.

13. The transducer of claim 1, wherein said secondary means comprises a circumferentially wound secondary.

14. The system of claim 13, wherein said secondary is uniformly wound under all of said primary means between the latter and said combining means.

15. The transducer of claim 1, wherein the total change in the phase of said output flux is approximately equal to 360°.

16. The transducer of claim 1, wherein the total change in phase of said output flux exceeds approximately 180°.

17. The transducer of claim 1, further comprising means for coupling said combining means to an external device, the position of which is to be detected by the transducer.

18. The transducer of claim 7, wherein said supply means comprises circuit means for supplying respective AC excitation signals to respective primaries and a reference signal, such signals having the same frequency.

19. The transducer of claim 18, further comprising output means for detecting the phase difference between said output AC electrical signal and said reference signal.

20. The transducer of claim 19, wherein said output means further comprises means for converting such phase difference to digital information indicative thereof.

21. The transducer of claim 19, wherein said phase difference is variable over more than an approximately 180° period.

22. The transducer of claim 21, wherein said phase difference is variable over approximately a 360° period.

23. The transducer of claim 1, wherein each of said primary means comprises a primary winding having a winding pattern that roughly approximates an arc tangent function.

24. A displacement to phase transducer, comprising plural primary means for producing in response to alternating current excitation alternating magnetic fluxes, combining means for producing an output flux having a phase dependent on the relative positions of said combining means and said primary means, at least one of said primary means and combining means beng movable relative to the other, secondary means for producing an output AC electrical signal having a phase corresponding to the phase of said output flux, wherein said combining means normally is positionable within the volume generally circumscribed by said primary means and between the ends of the primary means most proximate the extremities of the transducer, and further comprising antifringing primary winding means at each extremity of the transducer for reducing fringing effect, and means for normally preventing positioning of said combining means during operation of the transducer into substantial axial alignment with said anti-fringing primary means.

25. The transducer of claim 24, wherein each of said primary means has an approximately equal axial length, and wherein the axial length of each of said antifringing primary winding means is shorter than that of each of said primary means.

26. The transducer of claim 24, wherein the transducer has a measurable stoke length approximately equal to the axial length of the transducer less the axial lengths of said anti-fringing primary winding means and of said combining means.

27. The transducer of claim 24, wherein said plural primary means comprises at least three primary means, further comprising supply means for supplying such alternating current excitation such that at least three of such alternating magnetic fluxes have different phases and the phases of the alternating magnetic fluxes of any two adjacent primary means are different, and wherein said primary means and said anti-fringing primary winding means are positioned along a common axis, and wherein said supply means includes circuit means for developing a plurality of phase separated AC excitation signals and means for coupling one of such AC excitation signals to both primary means at approximately opposite ends of such axis and the remaining AC excitation signals to respective primary means and the anti-fringing primary winding means such that there is equal phase separation of the respective AC excitation signals coupled to respective pairs of adjacent primary means and anit-fringing primary winding means.

28. A displacement to phase transducer, comprising at least four primary means for producing in response to alternating current excitation alternating magnetic fluxes, combining means for producing an output flux having a phase dependent on the relative positions of said combining means and said primary means, at least one of said primary means and combining means being movable relative to the other, secondary means for producing an output AC electrical signal having a phase corresponding to the phase of said output flux, each of said primary means including a plurality of full layers of circumferentially wound turns and at least one partial layer of circumferentially wound turns so arranged to provide a substantially linear relation between the phase of said output flux with respect to the relative positions of said combining means and said primary means, supply means for supplying such alternating current excitation such that at least three of such alternating magnetic fluxes have different phases and the phases of the alternating magnetic fluxes of any two adjacent primary means are different by other than 180° or 360°, said supply means including means for supplying at least two AC excitation signals, and coupling means for coupling said supply means to said primary means such that the phase of the AC excitation signal in each of two adjacent primary means is different, and coupling means including means for coupling each of said AC excitation signals to two different primary means, respectively, in reverse polarity relation, and one of said primary means is divided approximately in half, each half being at a respective extremity of the transducer.

29. The transducer of claim 28, wherein said combining means comprises a movable magnetically responsive core, and further comprising means for preventing movement of said core approximately into alignment with either of said primary halves.

30. A displacement to phase transducer, comprising at least three primary means for producing in response to alternating current excitation alternating magnetic fluxes, a movable magnetically responsive core combining means for producing an output flux having a phase dependent on the relative positions of said combining means and said primary means, at least one of said primary means and combining means being movable relative to the other, secondary means for producing an output AC electrical signal having a phase of said output flux, wherein each of said primary means includes a plurality of full layers of circumferentially wound turns and at least one partial layer of circumferentially wound turns so arranged to provide a substantially linear relation between the phase of said output flux with respect to the relative positions of said combining means and said primary means, supply means for supplying such alternating current excitation such that at least three of such alternating magnetic fluxes have different phases and the phases of the alternating magnetic fluxes of any two adjacent primary means are different by other than 180° or 360°, said supply means including means for supplying plural AC excitation signals, coupling means for coupling said supply means to said primary means such that the phase of the AC excitation signal in each of two adjacent primary means is different, and means for preventing movement of said core approximately to alignment with at least the remote halves of the primary means at the extremities of the transducer.

31. A displacement to phase transducer, comprising at least three primary means for producing in response to alternating current excitation alternating magnetic fluxes, combining means for producing an output flux having a phase dependent on the relative positions of said combining means and said primary means, at least one of said primary means and combining means being movable relative to the other, secondary means for producing an output AC electrical signal having a phase corresponding to the phase of said output flux, wherein each of said primary means includes a plurality of full layers of circumferentially wound turns and at least one partial layer of circumferentially wound turns so arranged to provide a substantially linear relation between the phase of said output flux with respect to the relative positions of said combining means and said primary means, supply means for supplying such alternating current excitation such that at least three of such alternating magnetic fluxes have different phases and the phases of the alternating magnetic fluxes of any two adjacent primary means are different by other than 180° or 360°, and wherein said supply means comprises circuit means for supplying a plurality of AC excitation signals having respective phases, and wherein the number of said primary means equals at least the number of such phases plus one.

32. A displacement to phase transducer, comprising at least three primary means for producing a response to alternating current excitation alternating magnetic fluxes, combining means for producing an output flux having a phase dependent on the relative positions of said combining means and said primary means, at least one of said primary means and combining means being movable relative to the other, secondary means for producing an output AC electrical signal having a phase corresponding to the phase of said output flux, wherein each of said primary means includes a plurality of full layers of circumferentially wound turns and at least one partial layer of circumferentially wound turns so arranged to provide a substantially linear relation between the phase of said output flux with respect to the relative positions of said combining means and said primary means, and supply means for supplying such alternating current excitation such that at least three of such alternating magnetic fluxes have different phases and the phases of the alternating magnetic fluxes of any two adjacent primary means are different by other than 180° or 360°, said supply means including circuit means for developing separate input AC excitation signals having respective phases, and wherein the number of said primary means equals at least one plus twice the number of such phases. pg,43

33. The transducer of claim 32, wherein said supply means comprises means for supplying at least one of said input AC excitation to one of said primary means for passage therethrough in one direction and to another one of said primary means for passage therethrough in a relatively reverse direction.

34. A displacement to phase transducer, comprising at least three primary means for producing in response to alternating current excitation alternating magnetic fluxes, combining means for producing an output flux having a phase dependent on the relative positions of said combining means and said primary means, at least one of said primary means and combining means being movable relative to the other, secondary means for producing an output AC electrical signal having a phase corresponding to the phase of said output flux, wherein each of said primary means includes a plurality of full layers of circumferentially wound turns and at least one partial layer of circumferentially wound turns so arranged to provide a substantially linear relation between the phase of said output flux with respect to the relative positions of said combining means and said primary means, said primary means circumscribes a volume and said combining means normally is positionable within the volume generally circumscribed by said primary means and between the ends of the primary means most proximate the extremities of the transducer, and further comprising anti-fringing primary winding means positioned beyond each said extremity of the transducer for reducing fringing effect and means for normally preventing positioning of said combining means during operation of the transducer into substantial axial alignment with said anti-fringing primary winding means.

35. The transducer of claim 34, further comprising supply means for supplying such alternating current excitation such that at least three of such alternating magnetic fluxes have different phases and the phases of the alternating magnetic fluxes of any two adjacent primary means are different, and wherein said primary means and said anti-fringing primary winding means are positioned along a common axis, and wherein said supply means includes circuit means for developing a plurality of phase separated AC excitation signals and means for coupling one of such AC excitation signals to both primary means at approximately opposite ends of such axis and the other AC excitation signals to respective primary means and the antifringing primary winding means such that there is equal phase separation of the respective AC excitation signals coupled to respective pairs of adjacent primary means and anti-fringing primary winding means.

36. The transducer of claim 35, wherein each of said primary means has an approximately equal axial length.

37. The transducer of claim 36, wherein the axial length of each of said anti-fringing primary winding means is shorter than that of each of said primary means.

38. The transducer of claim 35, wherein the transducer has a measurable stroke length approximately equal to the axial length of the transducer less the axial lengths of said anti-fringing primary winding means and of said combining means.

* * * * *